United States Patent [19]

Boncek

[11] Patent Number: 5,617,233

[45] Date of Patent: Apr. 1, 1997

[54] TRANSPARENT OPTICAL NODE STRUCTURE

[75] Inventor: Raymond K. Boncek, Fayetteville, N.Y.

[73] Assignee: The United States of America as represented by the Secretary of the Air Force, Washington, D.C.

[21] Appl. No.: 535,854

[22] Filed: Sep. 28, 1995

[51] Int. Cl.⁶ .................................. H04J 4/00; H04J 14/00
[52] U.S. Cl. ........................... 359/123; 359/158; 370/389
[58] Field of Search ................................... 359/123, 125, 359/137, 140, 158; 370/94.1, 94.2

[56] References Cited

U.S. PATENT DOCUMENTS

| | | | |
|---|---|---|---|
| 4,468,085 | 8/1984 | Papuchon et al. | 350/96.14 |
| 4,503,532 | 3/1985 | Page | 370/1 |
| 5,109,444 | 4/1992 | Handa et al. | 385/14 |
| 5,222,163 | 6/1993 | Handa et al. | 385/14 |
| 5,223,972 | 6/1993 | Nishimura et al. | 359/337 |
| 5,241,409 | 8/1993 | Hill et al. | 359/128 |
| 5,287,422 | 2/1994 | Handa et al. | 385/14 |
| 5,446,571 | 8/1995 | Shabeer | 359/125 |
| 5,488,501 | 1/1996 | Barnsley | 359/137 |

*Primary Examiner*—Wellington Chin
*Assistant Examiner*—Kinfe-Michael Negash
*Attorney, Agent, or Firm*—William G. Auton

[57] ABSTRACT

A transparent optical node (TON) structure for use in a two-connected optical packet switching architecture. The TON is used in an interconnect employing deflection routing with two wavelength signaling where the data information of the packet resides on one wavelength $\lambda_1$ and the header information of the packet resides on a different wavelength $\lambda_2$. The TON is capable of full switch functionality: packet routing, add/drop multiplexing and packet buffering. The header portion of the packet is removed from data portion and can be rewritten before reinsertion. This invention allows for the use of a previously developed TON to be used with two-wavelength signaling.

8 Claims, 4 Drawing Sheets

TRANSPARENT OPTICAL NODE STRUCTURE

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to optical fiber systems, and more specifically the invention pertains to a transparent optical node (TON) structure for use in a two-connected optical packet switching architecture.

Packet or cell switching in communications is of current interest due to the great increase of signal transmission rates. As these transmission rates increase, files of information no longer occupy the full physical distance between source and destination nodes during transmission making circuit-switched techniques inefficient compared to a self-routing packet switched technique. To take advantage of the ultra-fast rates of optical interconnects, TON structures are required to avoid full optical to electronic to optical conversion of the signal at every node in the network. This conversion process reduces the throughput rates to that of current state-of the art electronics.

The task of providing transparent optical node interconnects for fiber optic communication systems is alleviated, to some extent, by the systems disclosed in the following U.S. Patents, the disclosures of which are incorporated herein by reference:

U.S. Pat. No. 5,284,422 issued to Handa;

U.S. Pat. No. 5,241,409 issued to Hill;

U.S. Pat. No. 5,223,972 issued to Nishimura;

U.S. Pat. No. 5,222,163 issued to Handa;

U.S. Pat. No. 5,109,444 issued to Handa;

U.S. Pat. No. 4,503,532 issued to Page; and

U.S. Pat. No. 4,468,085 issued to Papuchon.

The above cited patents all describe optical node structures for fiber optical communication systems. Latency in transit through an interconnect remains a problem for these systems. As the size of a network grows, the latency increases with the average number of hops a packet makes in transit in the network. For a ring topology interconnect, this latency increases linearly with the number of nodes N while in a two-connected topology such as Shuffle-net the latency increases logrithmically with N. A two-connected topology increases the physical complexity of the node structure, requiring routing and add/drop multiplexing for both inputs to both outputs of the node. One of the problems with ultra-fast transmission rates in packet switching is the necessity to obtain pertinent header information out of the packet's optical bit stream at every node the packet encounters. The present invention is intended to satisfy this need.

SUMMARY OF THE INVENTION

The present invention is an electro-optical system for conducting packetized dual wavelength optical signals that each contain a data portion with a first wavelength $\lambda_1$ and an header portion with a second wavelength $\lambda_2$. This invention includes an optical fiber network which conducts the packetized dual wavelength optical signals to their intended destinations by processing only the header portion of the packetized dual wavelength optical signals. The plurality of transparent optical nodes each avoid wasting time optical signal power by conducting but not processing the data portion of the packetized dual wavelength optical signals.

Each of the transparent optical nodes are made up of:

a bi-directional coupler which serves as a means for separating the data portion of the packetized dual wavelength optical signals from the header portion of the packetized dual wavelength optical signals; an optical fiber delay line that has a predetermined length to serve as a means for synchronizing the data portion and the header portion of the packetized dual wavelength optical signals by delaying the data portion of the packetized dual wavelength optical signals from the separating means for a predetermined delay period; an output switch which directs the reconstructed packetized dual wavelength optical signal towards its intended destination as prescribed by the header portion of the packetized dual wavelength optical signals; and a means for processing the signals which directs the configuration of the packetized dual wavelength optical signals as received from the separating means.

The processing means is composed of:

an optical power splitter which splits the address portion of the packetized dual wavelength optical signals into a plurality of header signals;

a plurality of optical fiber delay lines of varying length which are used to perform a serial to parallel conversion of the plurality of header signals;

a plurality of photodiode detectors which are each connected between the plurality of optical fiber delay lines and the plurality of output ports, and which are used to convert the optical header signal to an electrical header signal; and a plurality of output ports which output the header portion of the dual wavelength data signals in a parallel electrical form only when activated.

Another feature of the invention includes a plurality of header regeneration circuits which receive and process the output signals from one of the plurality of output ports of the processing means to reproduce thereby the header portion of the packetized dual wavelength optical signals as originally received by the processing means or as updated by the processing means.

It is an object of the present invention to provide an electro-optical system for conducting dual wavelength optical signals.

It is another object of the present invention to provide a transparent optical node structure that processes only the header portion of the packetized dual wavelength optical signals to conduct them to their ultimate destination without wasting time and optical power at the nodes processing the data portion of the signals.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a transparent optical node (TON) used in an interconnect employing deflection routing with two wavelength signaling where the data information of the packet resides on one wavelength $\lambda_1$ and the header information of the packet resides on a different wavelength $\lambda_2$. The TON is capable of full switch functionality: packet routing, add/drop multiplexing and packet buffering. The header portion of the packet is removed from data portion and can be rewritten before reinsertion. This invention allows for the use of a previously developed TON to be used with two-wavelength signaling.

The transparent optical node (TON) allows for the complete functionality of information routing. The TON creates temporary paths through a node for routing of incoming information packets, buffering of packets to alleviate contention resolution while increasing network throughput and add/drop multiplexing to transmit/receive packets to/from either output/input bus. These characteristics of the TON achieve full functionality in an n-connected architecture, where n is the number of input/output ports of the node. For this patent, the TON is ideally suited for an n=2 interconnect, but may be useful for TON's with n>2. A distributed, two-connected topology has the advantage of lower latency when compared with a one-connected ring topology. Two-wavelength signaling alleviates optical signal attenuation and adds network management/control flexibility while maintaining the ultra-high bandwidth of the data information in transit through a network.

The data portion of the packet is resident on wavelength $\lambda_1$ and can be transmitted at ultra-fast rates since it is never processed while in transit in the network. The header portion of the packet is resident on wavelength $\lambda_2$ ($\lambda 2 = \lambda_1$) and remains in the frequency bandwidth of state-of-the-art digital electronics, currently on the order of 10 gigabits per second (Gbit/s). The header is processed at every node, is used to determine the state of the transparent optical node and is regenerated at the node, thus new information can be impressed upon the header as it exits the node with its data respective portion of information. For example, this new information can be used to reset the packet's priority status, to determine if a packet has been in transit too long and thus must be removed from the network, or to change the packet's destination if a node or link on the network has been lost.

Figure 1:
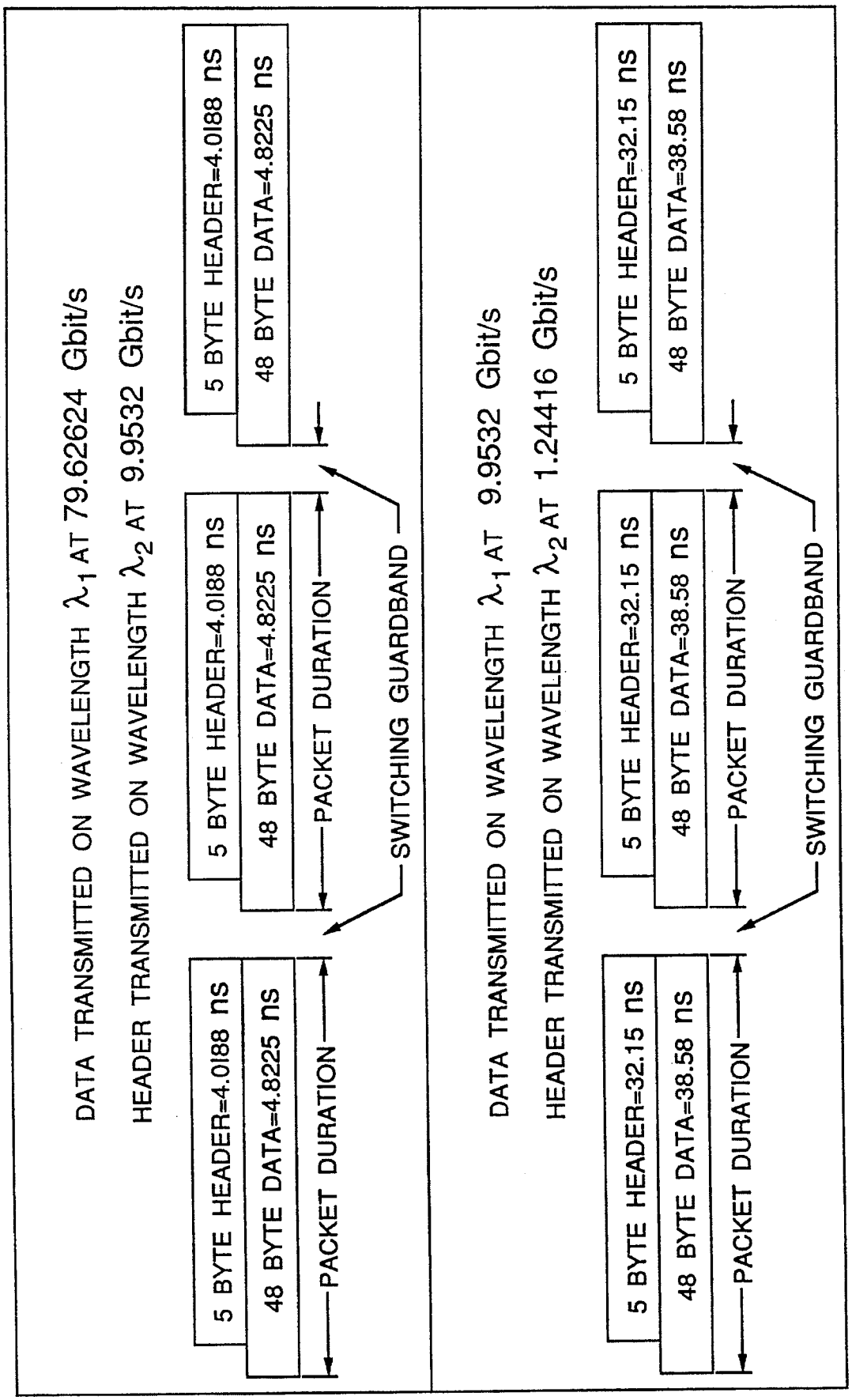
FIG. 1 is an illustration of two asynchronous transfer node signalling examples with dual wavelengths.

Packet or cell switching in communications is of current interest due to the great increase of signal transmission rates. As these transmission rates increase, files of information no longer occupy the full physical distance between source and destination nodes during transmission making circuit-switched techniques inefficient compared to a self-routing packet switched technique. To take advantage of the ultra-fast rates of optical interconnects, TON structures are required to avoid full optical to electronic to optical conversion of the signal at every node in the network. This conversion process reduces the throughput rates to that of current state-of-the art electronics. Latency in transit through an interconnect is also of issue. As the size of a network grows, the latency increases with the average number of hops a packet makes in transit in the network. For a ring topology interconnect, this latency increases linearly with the number of nodes N while in a two-connected topology such as Shuffle-net the latency increases logrithmically with N. A two-connected topology increases the physical complexity of the node structure, requiring routing and add/drop multiplexing for both inputs to both outputs of the node. One of the problems with ultra-fast transmission rates in packet switching is the necessity to obtain pertinent header information out of the packet's optical bit stream at every node the packet encounters. A routing decision for the packet is made once this information has been compared to other packets also arriving at the node. In order to alleviate the need to process the header at ultra-fast bit rates which imposes optical signal attenuation on the packet of information, a second wavelength $\lambda_2$ can be overlaid on the data and processed at a much slower rate. For the example of Asynchronous Transfer Mode (ATM), the header is 5 bytes long, while the data is 48 bytes long, a ratio of 1/9.6. Thus, the header can be processed at the rate of 9.95328 Gbit/s (OC-192 signaling rate) on wavelength $\lambda_1$. The packet signal is schematically shown in FIG. 1. This two-wavelength signaling rate alleviates the need to perform ultra-fast optical correlation and demultiplexing of the data portion of the signal until the packet has reached its destination node. Such ultra-fast processing can be very expensive compared to using high-speed electronic processing.

Figure 2:
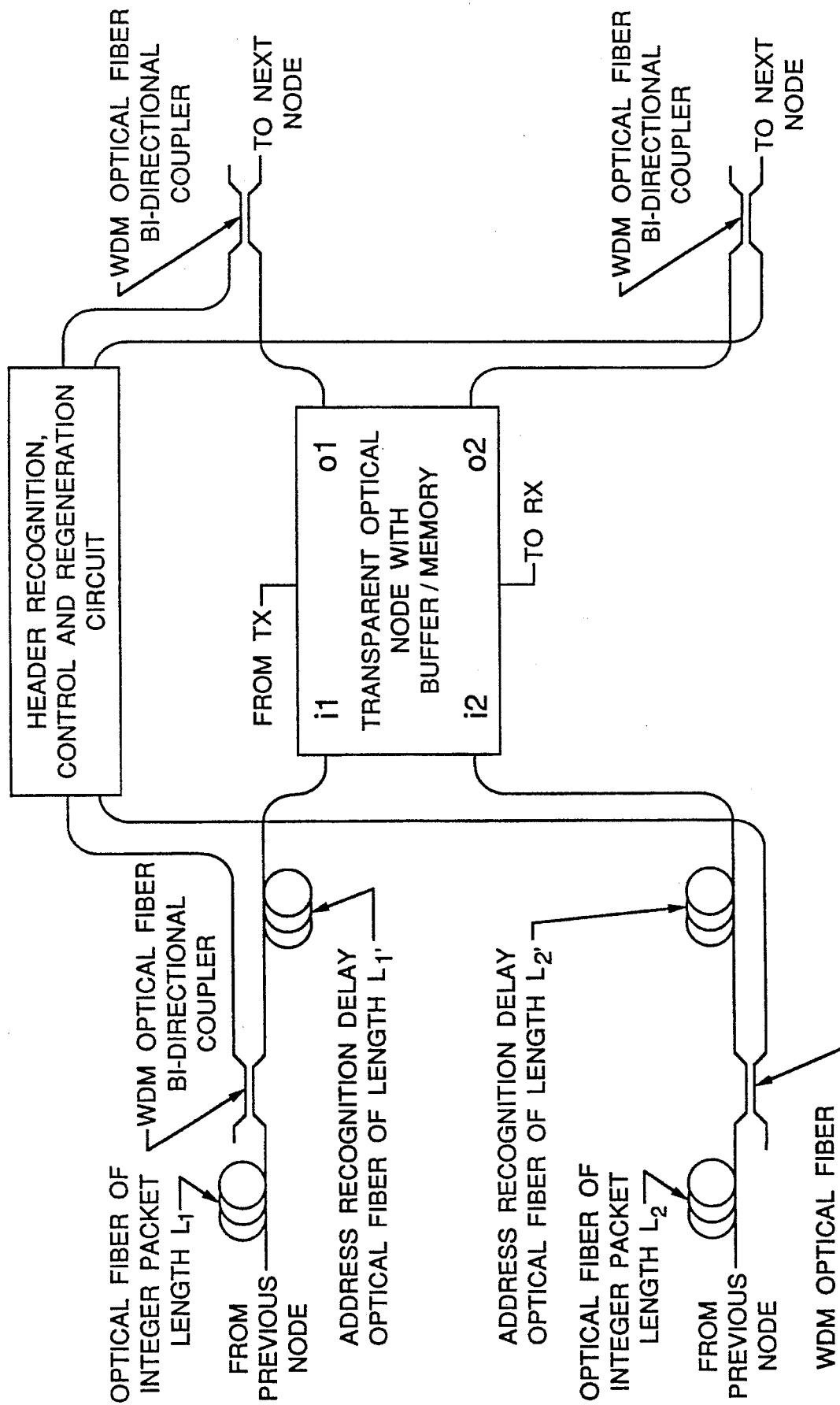
FIG. 2 is an illustration of a transparent optical node element of the present invention which can receive a dual wavelength data signal from two proceeding nodes, and which can output to two succeeding nodes.

The block diagram describing the two-connected node structure is shown in FIG. 2. Although this node structure can be used for any n-connected node interconnect, where n is any integer greater than or equal to one, due to the increased complexity processing routing and contention information as n increases, a two-connected node is probably most practical. The node inputs are connected to previous nodes in a two-connected network by optical fiber of lengths $L_n$ equal to an integer multiple of a packet length. For example, the group velocity of a signal in an optical fiber at 1300 nanometer (nm) wavelength is approximately $2.04559 \times 10^8$ meters per second (m/s). At a 48 byte data signaling rate of 9.9532 Gbit/s plus a 5 byte switching guardband this would result in a packet length of approximately 8.714 meters of optical fiber. The input fibers would connect to a wavelength division multiplexing (WDM) coupler to separate the header on wavelength $\lambda_2$ from the data on wavelength $\lambda_1$. The header would go to the header recognition, control and regeneration circuit and the data would go to the transparent optical node with buffer/memory.

The address recognition delay of optical fiber of length $L_n$ has two functions. First, it is used to delay the data portion of the packet from entering the transparent optical node before the state of the node is set. Second, it accommodates for the group velocity difference between the header and data signal wavelengths. For example, if the packet header is transmitted on a 1550 nm wavelength, the group velocity is approximately $2.04424 \times 10^8$ m/s and if the packet data is transmitted on a 1300 nm wavelength, the group velocity is approximately $2.04559 \times 10^8$ m/s. Since the distance between any node input and previous node output is known, one can calculate the needed length of optical fiber to make up for the group velocity difference between the header and packet in order to resynchronize the two signals. For example, if the distance between two nodes is two kilometers (km), then the 1300 nm data signal arrives $6.46 \times 10^{-9}$ S before the 1550 nm header signal. Thus, the data signal needs to be delayed through 1.321 meters of additional optical fiber to resynchronize the header and data signals. This address recognition delay and synchronization portion of optical fiber is always placed at the input to a given node, therefore it is also easily accessible.

Figure 3:
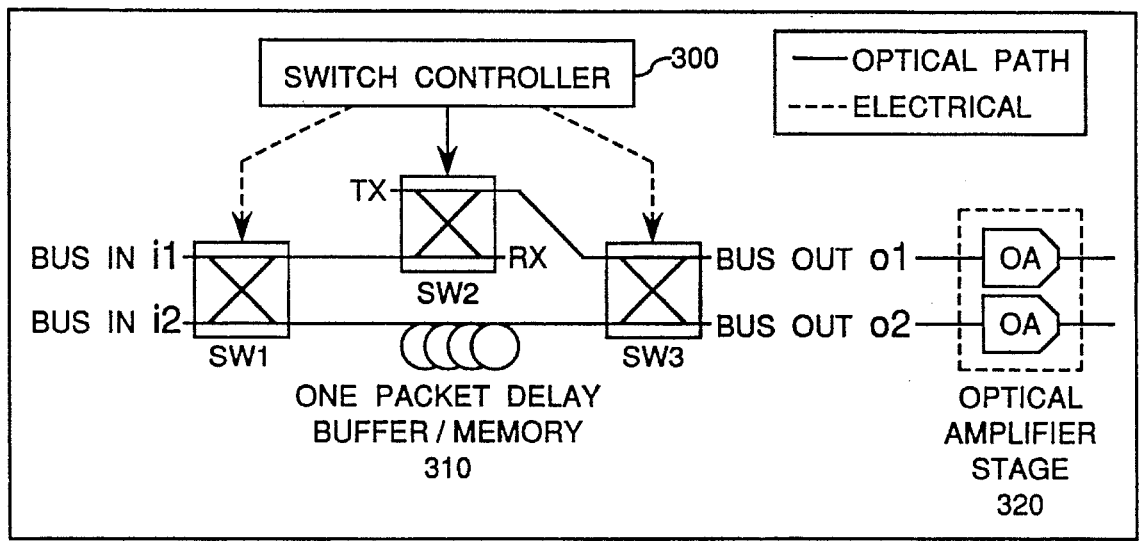
FIG. 3 is a detailed schematic of a single transparent optical node.

From the address recognition delay, the data would flow through the transparent optical node (TON). An example of a TON with drop/add multiplexing and buffer/memory capability for a two-connected network is shown in FIG. 3. This node performs the task of routing incoming packets, reducing deflections of packets contending for the same output port by using a one packet length optical buffer, inserting new packets and receiving packets destined for this node. This three cross-bar switch architecture is the simplest configuration for performing these tasks. Other configurations with more cross-bar switches are possible and achieve higher network throughput at the cost of a more complex switch-state controller. Once through the TON, the data portion of the packet can be optimally amplified to restore losses incurred in transit through the node. Then, the data field is attached to its respective header field through a WDM coupler before transmission to the next TON in the network.

Figure 4:
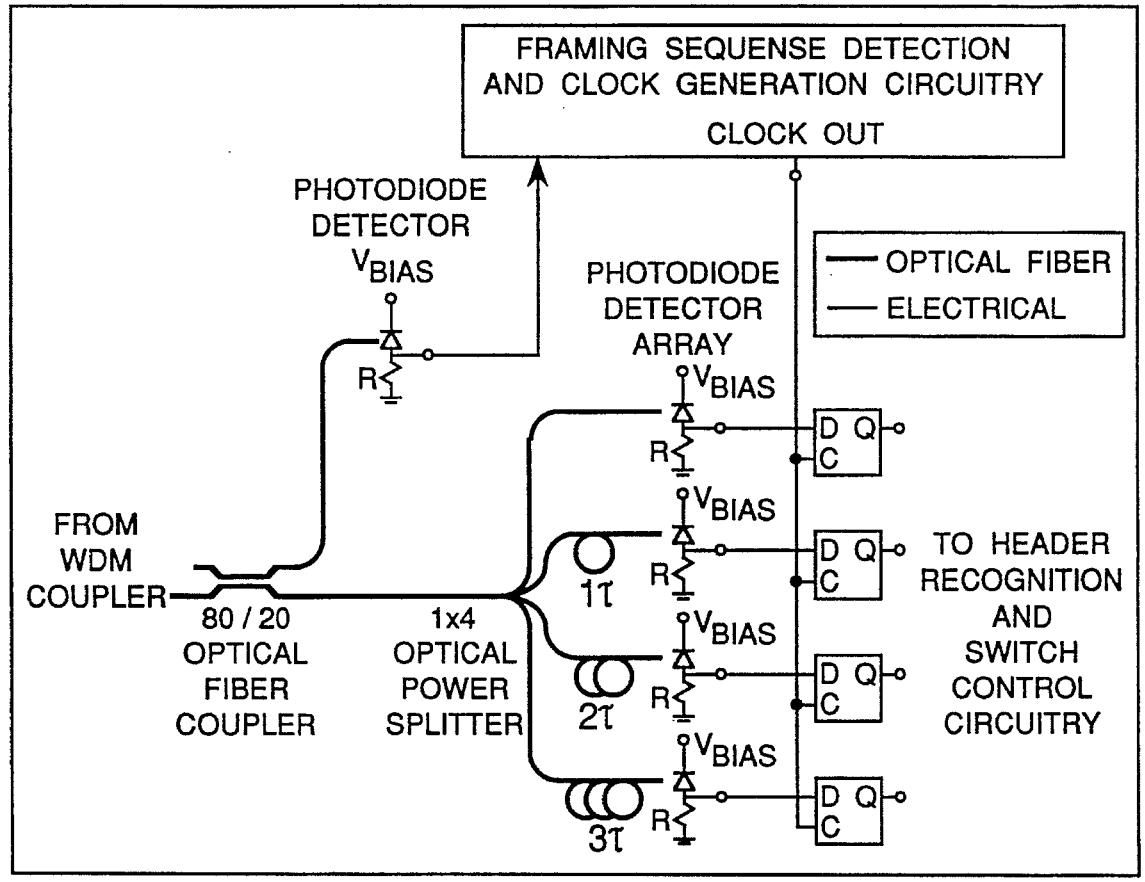
FIG. 4 is a schematic of a header recognition circuit.

The header is detected and decoded in parallel as shown in FIG. 4. The optical power associated with the header is split by an 80%/20% fiber coupler and 20% is photodiode detected to establish the occurrence of the framing sequence used to begin every header of a packet and then to generate a repetitive clock signal used to parallel detect four-bit sequences of the header field into high-speed D-type flip-flops. The electronic signal outputs from these flip-flops are then sent to the header recognition and switch control circuitry where they are compared with the headers of packets incident on the other input ports, at the transmitter input port and in the buffer/memory element of the TON. The output of the switch control circuitry drives the electro-optic cross-bar switches in the TON.

Figure 5:
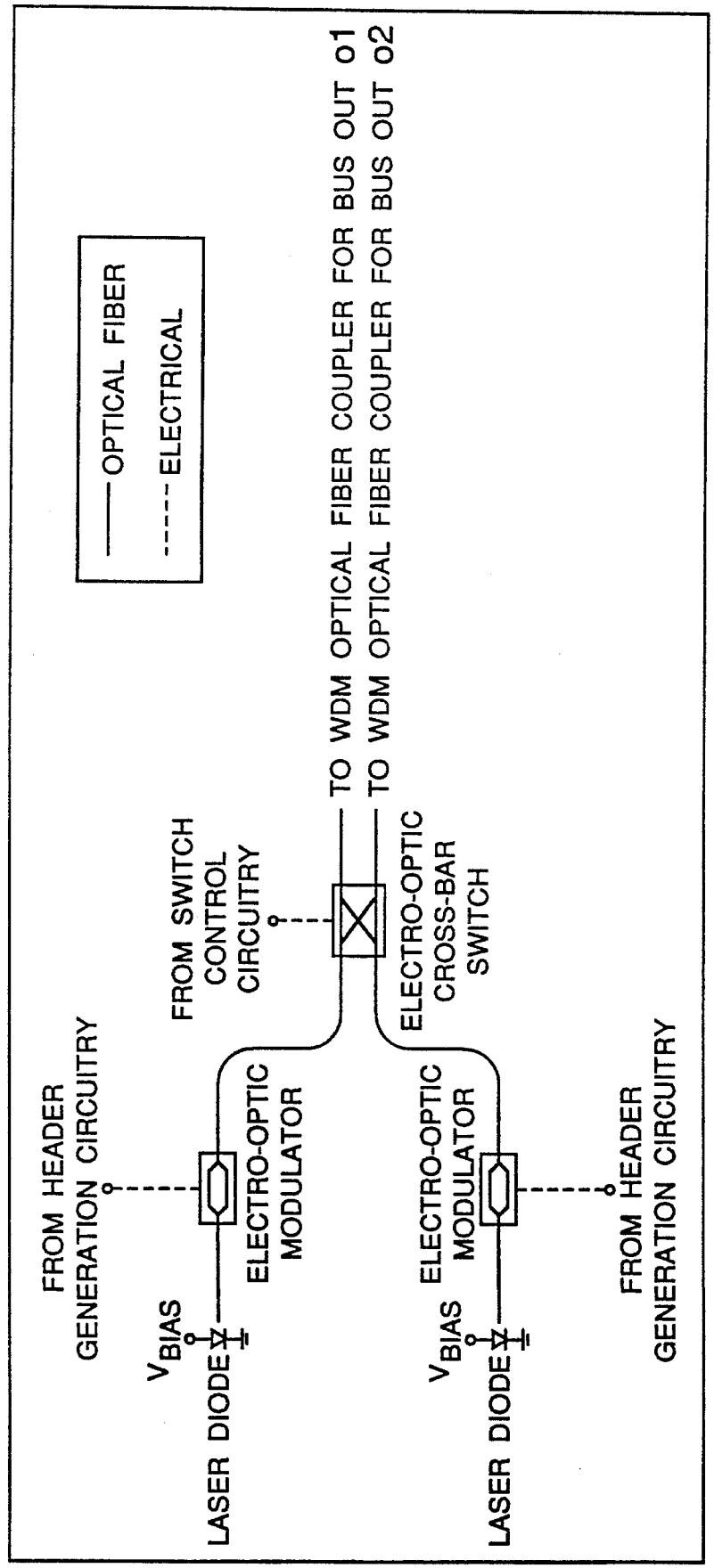
FIG. 5 is a schematic of a header regeneration circuit to recreate the header and attach the header to its respective data packets.

Once the TON state is set, the headers need to be regenerated and attached to their respective data packets. Two headers need to be generated for the two outputs of the node. Header generation is illustrated in FIG. 5 for the TON of FIG. 3. Here, a semiconductor laser diode is driven by a dc current and an external electro-optic modulator is used to encode the header information on the optical carrier. An electro-optic cross-bar switch is then used to attach the header to the correct output port. The use of an electro-optic cross-bar switch for this function reduces the complexity of the electronic header generation circuitry, i.e., whatever is in the buffer/memory of FIG. 3 is always latched to the lower laser diode of FIG. 5. Therefore, the electro-optic crossbar switch state of FIG. 5 is set the same as electro-optic cross-bar switch SW3 of FIG. 3.

A typical loss budget associated with the node would be as follows. Insertion losses, neglecting absorption in the optical fiber link: each WDM coupler −1 dB, each cross-bar switch/electro-optic modulator −4 dB. Thus, the data signal experiences a −14 dB loss at each node, which can be made up by optical amplifiers at the output to the node. (The buffer will have a matching insertion loss with SW2 to balance the node losses). The header signal experiences a loss of −17 dB from insertion through the optical modulator, cross-bar switch, WDM couplers and power splitter at the header recognition block. This loss need only be compensated for by matching the output power level of the laser diode generating the header signal to the sensitivity of the photodiode detector array of the header recognition circuitry.

This work combines advantages of multiple technologies in order to create a new ultra-fast packet switch interconnect. A distributed, two-connected topology is used to reduce latency in the optical interconnect. Each node is optically transparent to the data signal, allowing ultra-fast transmission rates. Each node has the capability of routing, buffering, add/drop multiplexing and header reinsertion. A single wavelength is used for transmission of the header, thus reducing optical signal attenuation associated with tapping off power from the packet for header recognition. A different single wavelength is used for the data. The use of two wavelengths throughout the interconnect allows for tuning of optical path elements such as optical amplifiers, optical filters, electro-optic modulators, cross-bar switches and WDM couplers to minimize interference, crosstalk, and noise. Since the transparent optical node structure is actually a 3 input/3 output component, it would also be useful for overlay optical networks such as a hypercube.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An electro-optical system for conducting packetized dual wavelength optical signals that each contain a data portion with a first wavelength $\lambda_1$ a header portion with a second wavelength $\lambda_2$, said electro-optical system comprising:

an optical fiber network which conducts said packetized dual wavelength optical signals;

a means for separating the data portion of the packetized dual wavelength optical signals from the header portion of the packetized dual wavelength optical signals;

a means for synchronizing the data portion and the header portion of the packetized dual wavelength optical signals by delaying the data portion of the packetized dual wavelength optical signals after the separating means for a predetermined delay period;

an output switch which reconstructs the packetized dual wavelength optical signals and directs the packetized dual wavelength signal towards its intended destination as prescribed by the header portion of the packetized dual wavelength signals;

an optical power splitter which splits the header portion of the packetized dual wavelength optical signals into a plurality of address signals;

a plurality of output ports which output the header portion of the packetized dual wavelength optical signals from the optical power splitter only when activated; and a plurality of photodiode detectors which are each connected between the optical power splitter and one of the plurality of output ports, and which are used to convert optical header signals into electrical header signals.

2. An electro-optical system, as defined in claim 1, further comprising a plurality of header regeneration circuits which receive and processes the output signals from one of the plurality of output ports of the processing means to reproduce thereby the header portion of the packetized dual wavelength optical signals as originally received by the processing means or as updated by the processing means.

3. An electro-optical system for conducting packetized dual wavelength optical signals that each contain a data portion with a first wavelength $\lambda_1$ a header portion with a second wavelength $\lambda_2$, said electro-optical system comprising:

an optical fiber network which conducts said packetized dual wavelength optical signals;

a means for separating the data portion of the packetized dual wavelength optical signals from the header portion of the packetized dual wavelength optical signals, wherein said separating means comprises a bidirectional coupler which separates the header portion and data portion of the packetized dual wavelength optical signals;

a means for synchronizing the data portion and the header portion of the packetized dual wavelength optical signals by delaying the data portion of the packetized dual wavelength optical signals after the separating means for a predetermined delay period;

an output switch which reconstructs the packetized dual wavelength optical signals and directs the packetized dual wavelength signal towards its intended destination as prescribed by the header portion of the packetized dual wavelength optical signals;

an optical power splitter which splits the header portion of the packetized dual wavelength optical signals into a plurality of address signals;

a plurality of output ports which output the header portion of the packetized dual wavelength optical signals from the optical power splitter only when activated; and a plurality of photodiode detectors which are each connected between the optical power splitter and one of the plurality of output ports, and which are used to convert optical header signals into electrical header signals.

4. An electro-optical system, as defined in claim 3, further comprising a plurality of header regeneration circuits which receive and processes the output signals from one of the plurality of output ports of the processing means to reproduce thereby the header portion of the packetized dual wavelength optical signals as originally received by the processing means or as updated by the processing means.

5. An electro-optical system for conducting packetized dual wavelength optical signals that each contain a data portion with a first wavelength $\lambda_1$ a header portion with a second wavelength $\lambda_2$, said electro-optical system comprising:

an optical fiber network which conducts said packetized dual wavelength optical signals;

a means for separating the data portion of the packetized dual wavelength optical signals from the header portion of the packetized dual wavelength optical signals;

a means for synchronizing the data portion and the header portion of the packetized dual wavelength optical signals by delaying the data portion of the packetized dual wavelength optical signals after the separating means for a predetermined delay period, wherein said synchronizing means comprises a segment of optical fiber which has a predetermined length which will delay/advance said data portion of the packetized dual wavelength optical signals from said separating means by a predetermined delay/advance period;

an output switch which reconstructs the packetized dual wavelength optical signals and directs the packetized dual wavelength signal towards its intended destination as prescribed by the header portion of the packetized dual wavelength optical signals;

an optical power splitter which splits the header portion of the packetized dual wavelength optical signals into a plurality of address signals;

a plurality of output ports which output the header portion of the packetized dual wavelength optical signals from the optical power splitter only when activated; and a plurality of photodiode detectors which are each connected between the optical power splitter and one of the plurality of output ports, and which are used to convert optical header signals into electrical header signals.

6. An electro-optical system, as defined in claim 5, further comprising a plurality of header regeneration circuits which receive and processes the output signals from one of the plurality of output ports of the processing means to reproduce thereby the header portion of the packetized dual wavelength optical signals as originally received by the processing means or as updated by the processing means.

7. An electro-optical system for conducting packetized dual wavelength optical signals that each contain a data portion with a first wavelength $\lambda_1$ a header portion with a second wavelength $\lambda_2$, said electro-optical system comprising:

an optical fiber network which conducts said packetized dual wavelength optical signals;

a means for separating the data portion of the packetized dual wavelength optical signals from the header portion of the packetized dual wavelength optical signals, wherein said separating means comprises a bidirectional coupler which separates the header portion and data portion of the packetized dual wavelength optical signals;

a means for synchronizing the data portion and the header portion of the packetized dual wavelength optical signals by delaying the data portion of the packetized dual wavelength optical signals after the separating means for a predetermined delay period, wherein said synchronizing means comprises a segment of optical fiber which has a predetermined length which will delay/advance said data portion of the packetized dual wavelength optical signals from said separating means by a predetermined delay/advance period;

an output switch which reconstructs the packetized dual wavelength optical signals and directs the packetized dual wavelength signal towards its intended destination as prescribed by the header portion of the packetized dual wavelength signals;

an optical power splitter which splits the header portion of the packetized dual wavelength optical signals into a plurality of address signals;

a plurality of output ports which output the header portion of the packetized dual wavelength optical signals from the optical power splitter only when activated; and a plurality of photodiode detectors which are each connected between the optical power splitter and one of the plurality of output ports, and which are used to convert optical header signals into electrical header signals.

8. An electro-optical system, as defined in claim 7, further comprising a plurality of header regeneration circuits which receive and processes the output signals from one of the plurality of output ports of the processing means to reproduce thereby the header portion of the packetized dual wavelength optical signals as originally received by the processing means or as updated by the processing means.

\* \* \* \* \*